(No Model.)
A. N. WOLF.
FLOUR MILL.
No. 255,747. Patented Mar. 28, 1882.
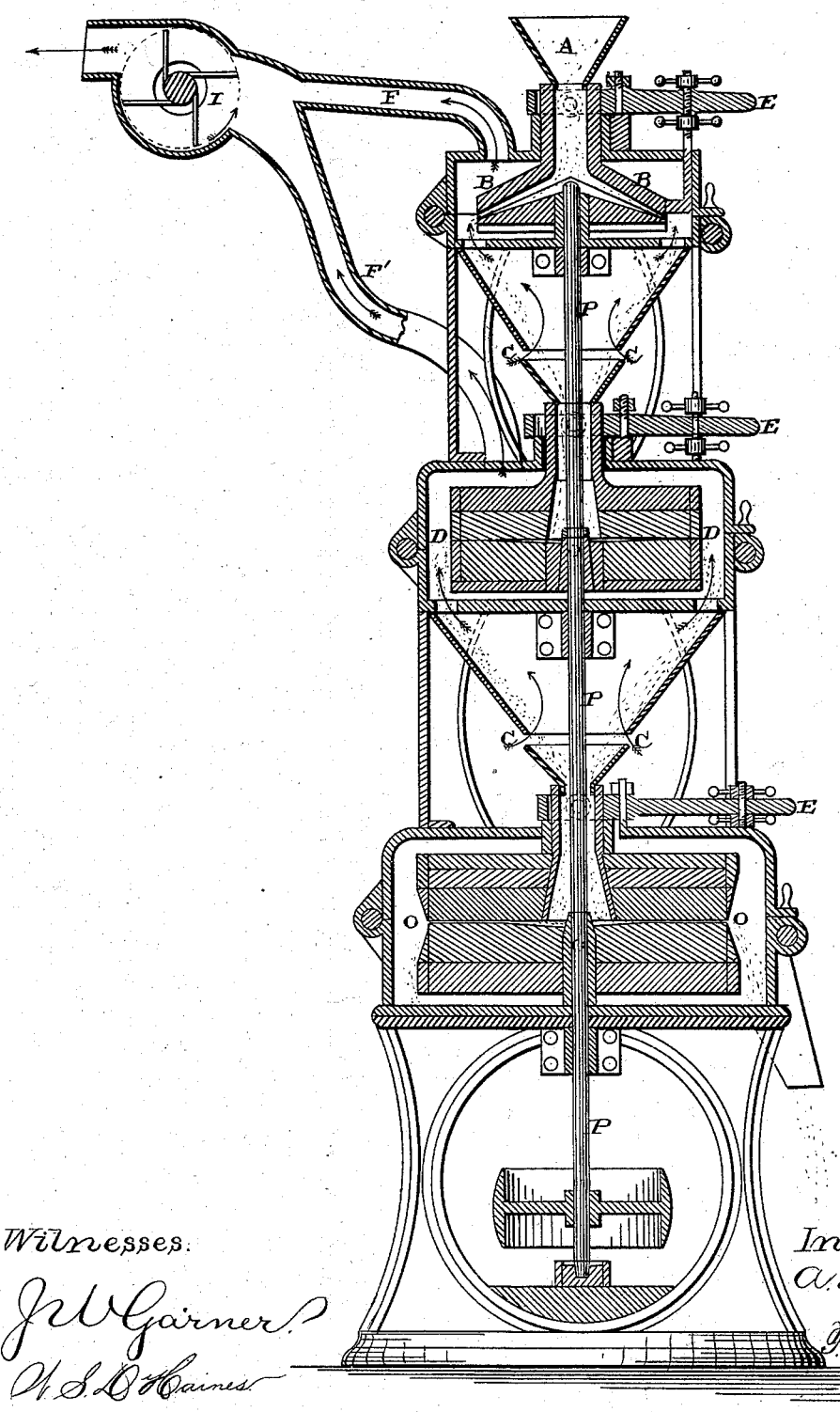
Witnesses:
J. W. Garner
W. S. D. Haines
Inventor:
A. N. Wolf
per
F. A. Lehmann
Atty

UNITED STATES PATENT OFFICE.

ABRAHAM N. WOLF, OF ALLENTOWN, PENNSYLVANIA, ASSIGNOR OF ONE-HALF TO JOS. BARBER, OF SAME PLACE.

FLOUR-MILL.

SPECIFICATION forming part of Letters Patent No. 255,747, dated March 28, 1882.

Application filed January 20, 1882. (No model.)

*To all whom it may concern:*

Be it known that I, ABRAHAM N. WOLF, of Allentown, in the county of Lehigh and State of Pennsylvania, have invented certain new and useful Improvements in Flour-Mills; and I do hereby declare the following to be a full, clear, and exact description of the invention, such as will enable others skilled in the art to which it pertains to make and use it, reference being had to the accompanying drawing, which forms part of this specification.

My invention relates to an improvement in flour-mills; and it consists in the combination of a number of pairs of stones which are arranged in such relation to each other that the grain is passed successively from one to the other, and as the grain leaves each stone it is struck by a draft of air, which carries away the flour and lighter particles, as will be more fully described hereinafter.

The object of my invention is to gradually reduce the grain and to carry off the flour as fast as it leaves the stones, and thus dispense with two bolting-reels and purifiers.

The accompanying drawing represents a vertical section of my invention.

The frame-work in which the different runs of stones are placed may be of any suitable construction desired, and upon the top of this frame is placed the hopper A, into which the wheat is poured. Below this hopper is placed the first pair of stones, B, which crack the wheat and reduce it to any desired extent, and as this broken and cracked wheat leaves the stones it is scattered by centrifugal force around through the frame, so that the draft of air which enters through the openings C, and which is caused to flow upward through the pipe F by the suction-fan I, will carry away all of the flour that has been produced by the first run of stones. The cracked wheat drops down through the frame past the opening C, made through the conical portion of the inclosing-frame, directly into the second run of stones, D, where it is again reduced. As the flour is thrown outward from these stones it is scattered around in the frame, and is again struck by the currents of air which pass off through the second pipe, F′, toward the suction-fan. In this second run of stones the coarse broken wheat is reduced to middlings, which, with the flour, is drawn off by the upward current of air, while the heavier portions pass down to the third run of stones, O, below, where the last reduction takes place.

Although only three runs of stones are here shown, which are all driven by the same shaft, P, it is evident that a greater number may be used, if so preferred.

Each run of stones is provided with an adjusting-lever, E, for the purpose of adjusting the distance between the stones, and the casing is divided into sections, so that the casing can be opened back over any one of the stones, and thus give free access to them for dressing or repairing them in any manner. As the frame is divided into a series of sections which are hinged together just opposite the center of each pair of stones, the whole of the frame above any one pair of stones can be turned back after the shaft P has been removed and the pipes F F′ detached.

The flour and middlings which are drawn through the pipes F F′ are passed into a suitable bolt, which separates the flour from the middlings.

The great advantage of this mill consists in the gradual reduction of the grain and drawing off the finer portion as fast as it issues from the stones, while the heavier parts are allowed to pass on through the mill, and thus dispense with the two bolting-reels and purifiers.

Having thus described my invention, I claim—

The combination of a driving-shaft, P, the runs of stones B D O, placed one above the other, the upper stone of each run being provided with an adjusting-lever, E, a suction-fan, I, suitable connecting-pipes, F′ F, and an inclosing-frame for the stones, which has an opening, C, made through it below each run of stones for the upward draft of air, substantially as shown.

In testimony whereof I affix my signature in presence of two witnesses.

ABRAHAM N. WOLF.

Witnesses:
J. FRED WEINSHEIMER,
H. E. RUBER.